UNITED STATES PATENT OFFICE.

JOHN POST, OF NEW YORK, N. Y.

CHEMICAL ELECTRIC EXCITANT.

SPECIFICATION forming part of Letters Patent No. 639,767, dated December 26, 1899.

Application filed July 6, 1899. Serial No. 722,963. (No specimens.)

*To all whom it may concern:*

Be it known that I, JOHN POST, a citizen of the United States, residing at New York, in the county of New York and State of New York, have invented certain new and useful Improvements in Chemical Electric Excitants; and I do declare the following to be a full, clear, and exact description of the invention, such as will enable others skilled in the art to which it appertains to make and use the same.

My invention relates to chemical electric batteries; and it consists in the combination of certain elements hereinafter named, which constitute, when properly treated, an electric excitant adapted for use in cells of ordinary construction.

The elements employed are easily obtainable at small cost and possess an electrogenerative force of great energy.

The invention is applied, to propel automobiles and other vehicles, to run machinery, and to energize electric lights, as a chemical battery.

The elements I employ are pulverized charcoal, glucose, hydrochloric acid, and sucrose in approximately equal parts, and water ninety-eight per cent. These elements are thoroughly mixed.

What I claim, and desire to secure by Letters Patent, is—

1. An electrical excitant, composed of charcoal, glucose, hydrochloric acid, sucrose and water, as herein specified.

2. An electrical excitant composed of pulverized charcoal, glucose, hydrochloric acid and sucrose in approximately equal parts, and water ninety-eight per cent., substantially as specified.

In testimony whereof I affix my signature in presence of two witnesses.

JOHN POST.

Witnesses:
   J. J. NELLIGAN,
   D. L. GITT.